(12) United States Patent  (10) Patent No.: US 7,464,898 B1
Goodzeit et al.  (45) Date of Patent: Dec. 16, 2008

(54) PRECISION THRUST/SUN TRACKING ATTITUDE CONTROL SYSTEM FOR GIMBALED THRUSTER

(75) Inventors: Neil E. Goodzeit, Princeton, NJ (US); Moonish R. Patel, Fremont, CA (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 713 days.

(21) Appl. No.: 10/963,574

(22) Filed: Oct. 14, 2004

Related U.S. Application Data (60) Provisional application No. 60/511,583, filed on Oct. 14, 2003.

(51) Int. Cl.
*B64G 1/24* (2006.01)
(52) U.S. Cl. .............................. 244/164; 244/171; 701/4
(58) Field of Classification Search ................. 244/164, 244/171, 165, 169; 701/4
See application file for complete search history.

(56) References Cited

U.S. PATENT DOCUMENTS

| | | | |
|---|---|---|---|
| 6,186,446 B1 * | 2/2001 | Tilley et al. | 244/164 |
| 6,237,876 B1 * | 5/2001 | Barker | 244/164 |
| 6,629,672 B1 | 10/2003 | Goodzeit et al. | |
| 6,921,048 B2 * | 7/2005 | Liu | 244/164 |
| 7,113,851 B1 * | 9/2006 | Gelon et al. | 701/13 |

* cited by examiner

*Primary Examiner*—J. Woodrow Eldred
(74) *Attorney, Agent, or Firm*—McDermott Will & Emery LLP (57) ABSTRACT

A system for providing precision thrust and sun tracking attitude control is provided. The system determines a proximity region and alternately engages either an ideal operational mode or a predictive operational mode based on whether a thrust trajectory vector is in the proximity region in order to provide attitude control. The proximity region is determined based on an angle between the thrust trajectory vector and a sun vector. For example, the angle is about 20-30 degrees. The system engages the predictive operational mode when the thrust trajectory vector enters the proximity region. When in the predictive operational mode, the system periodically re-calculates the thrust trajectory vector and determines where the thrust trajectory vector will exit the proximity region. Based on the determination with respect to where the thrust trajectory vector will exit the proximity region, the system provides appropriate attitude control adjustment with respect to gimbaled thrusters and solar arrays so as to reduce sun-pointing errors and keep the sun in a predetermined yaw/roll plane. The system can be used in a spacecraft including a satellite.

30 Claims, 7 Drawing Sheets

PRECISION THRUST/SUN TRACKING ATTITUDE CONTROL SYSTEM FOR GIMBALED THRUSTER

CROSS-REFERENCES TO RELATED APPLICATION(S)

The present application claims the benefit of priority under 35 U.S.C. §119 from U.S. Provisional Patent Application Ser. No. 60/511,583, entitled "PRECISION THRUST/SUN TRACKING ATTITUDE CONTROL SYSTEM FOR HALL CURRENT THRUSTER (HCT)", filed on Oct. 14, 2003, the disclosure of which is hereby incorporated by reference in its entirety for all purposes.

BACKGROUND OF THE INVENTION

The present invention generally relates to gimbaled thrusters and more particularly to a method and system for providing high-accuracy thrust trajectory tracking and solar array sun pointing during orbit transfer.

Gimbaled thrusters (including Hall Current Thrusters (HCTs)) are used by spacecraft, such as military communications spacecraft, to perform partial orbit transfer. The HCTs, which are much more fuel-efficient than chemical thrusters, enable as much as 500 kg of additional payload to be delivered to the mission orbit.

When used for orbit transfer, the HCTs are fired continuously for several months while the spacecraft attitude is controlled to track an optimal thrust trajectory vector. The attitude control system, which uses reaction wheel assemblies (RWAs) for attitude control and gimbaled HCTs for momentum adjust, maintains alignment of the HCT thrust axis with the trajectory vector. The system simultaneously rotates the spacecraft about the trajectory vector and positions the solar arrays to maintain accurate sun pointing. The sun pointing control is necessary to provide adequate electrical power to operate the spacecraft and the HCTs. The HCTs require roughly 9 kW. Trajectory tracking and sun pointing attitude control is straightforward except within orbital regions where the angular separation between the thrust trajectory vector and the sun vector is small. Within these regions, referred to as "proximity regions", control torques and angular rates in excess of the control system's capability may be necessary for accurate sun pointing control.

Conventional methods address the foregoing problem simply by constraining the rate at which the spacecraft can rotate. While constraining the rotation rate may be effective, it can also create large solar array sun pointing errors which, in turn, may result in the need for a larger solar array or larger batteries with commensurate mass and cost penalties.

Hence, it would be desirable to provide a method and system that is able to provide more efficient sun pointing control in proximity regions.

SUMMARY OF THE INVENTION

In one exemplary embodiment, a control arrangement is provided that alternately employs two sun/thrust tracking strategies or modes on an automatic basis. The two strategies involve ideal thrust/sun tracking and predictive thrust/sun tracking respectively. The predictive mode is used to mitigate or avoid the singularity condition that can occur for small angular separation between the thrust trajectory and sun vectors.

In another exemplary embodiment, a system for providing precision thrust and sun tracking attitude control is provided. The system determines a proximity region and alternately engages either an ideal operational mode or a predictive operational mode based on whether a thrust trajectory vector is in the proximity region in order to provide attitude control. The proximity region is determined based on an angle between the thrust trajectory vector and a sun vector. For example, the angle is about 20-30 degrees. The system engages the predictive operational mode when the thrust trajectory vector enters the proximity region. When in the predictive operational mode, the system periodically re-calculates the thrust trajectory vector and determines where the thrust trajectory vector will exit the proximity region. Based on the determination with respect to where the thrust trajectory vector will exit the proximity region, the system provides appropriate control signals to gimbaled thrusters, reaction wheel assemblies and solar arrays so as to reduce sun-pointing errors and keep the sun in a predetermined yaw/roll plane. The system can be used in a spacecraft including a satellite.

The present invention may provide a number of advantages and/or benefits. For example, the present invention improves sun-pointing performance by taking control action based on the predicted movement of the thrust trajectory vector relative to the sun vector in the proximity region where the angular separation of the thrust and sun vectors is small. Based on the disclosure and teachings provided herein, a person of ordinary skill in the art will realize other advantages and benefits provided by the present invention.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

The present invention in the form of one or more exemplary embodiments will now be described. The present invention provides methods and systems that improve sun pointing, limit angular rates to specified values, and operate automatically without the need for ground support. In one embodiment, a system installed on a spacecraft alternates between two control strategies or modes, namely, an ideal thrust/sun tracking strategy outside of a proximity region and a predictive thrust/sun tracking strategy within the proximity region.

The predictive strategy is automatically invoked when the angle between a thrust trajectory vector and a sun vector is below a specified value, e.g., about 20 to 30 degrees. Based on the disclosure and teachings provided herein, a person of ordinary skill in the art will appreciate how to select the specified value. At each time step, the system predicts the thrust trajectory vector's orientation at the proximity region exit and the time until the thrust trajectory vector actually arrives at that exit. The system then rotates the spacecraft about the thrust axis so that the actual attitude coincides with the ideal thrust/sun attitude at the proximity region exit. Concurrently, the solar array position is controlled to minimize the error in the solar array sun pointing. The advantage of the foregoing predictive control is that the system takes action immediately at the entrance to the proximity region to ensure that the correct sun-pointing attitude is achieved by the time the spacecraft exits the proximity region. Once the thrust trajectory exits the proximity region, the system automatically switches back to an ideal thrust/sun tracking strategy.

Figure 1:
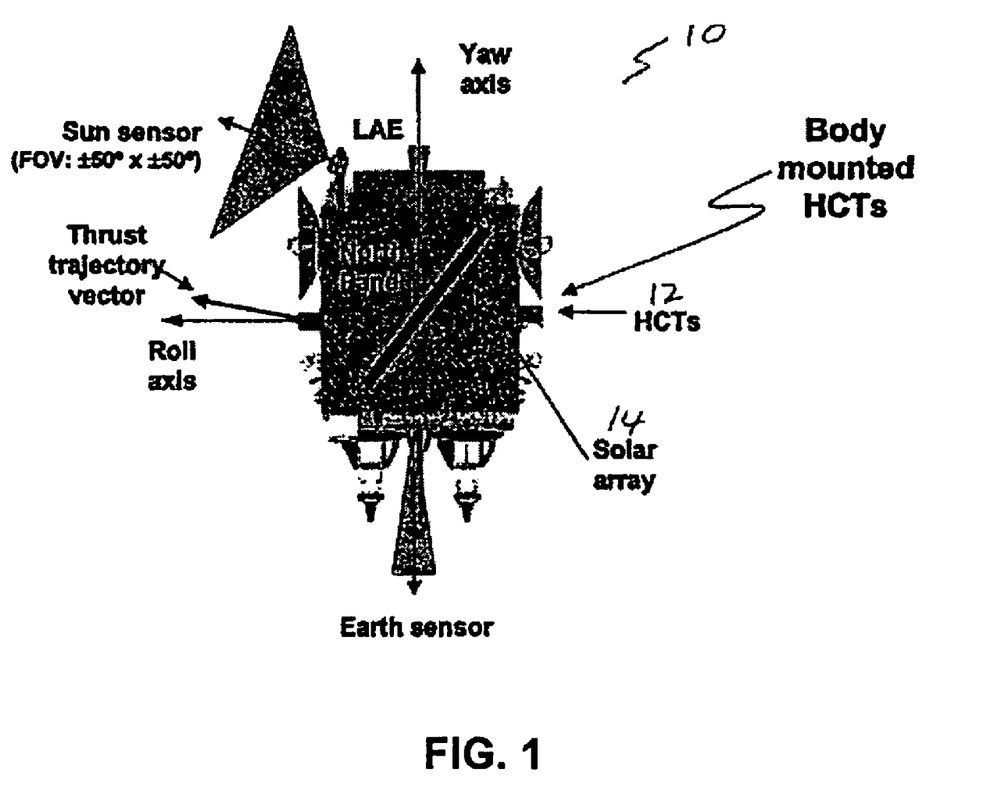
FIG. 1 is a simplified schematic diagram illustrating a spacecraft having features according to an exemplary embodiment of the present invention.

FIG. 1 shows a spacecraft 10 having a system according to one embodiment of the present invention. In one embodiment, the spacecraft 10 is a satellite and the system is implemented in the form of spacecraft flight software. The spacecraft 10 includes a complement of four (4) "body mounted" HCTs 12 mounted on separate gimbaled platforms, each with a range of motion of ±35 degrees in both the azimuth and the orthogonal elevation directions. One (1) HCT is mounted at the corner of the north and east faces and another at the corner of the north and west faces. Two (2) more HCTs are similarly mounted on the south side of the spacecraft 10. Based on the disclosure and teachings provided herein, it will be appreciated by a person of ordinary skill in the art that other arrangements of the HCTs are possible and can be used with the present invention. For example, in another arrangement, referred to as an "aft mounted" arrangement, four (4) HCTs are mounted on the aft end of the spacecraft (adjacent to a LAE (Liquid Apogee Engine) face or base panel), with two (2) HCTs mounted on a gimbaled platform on the north side of the spacecraft and two (2) mounted on a platform on the south side of the spacecraft.

Figure 2:
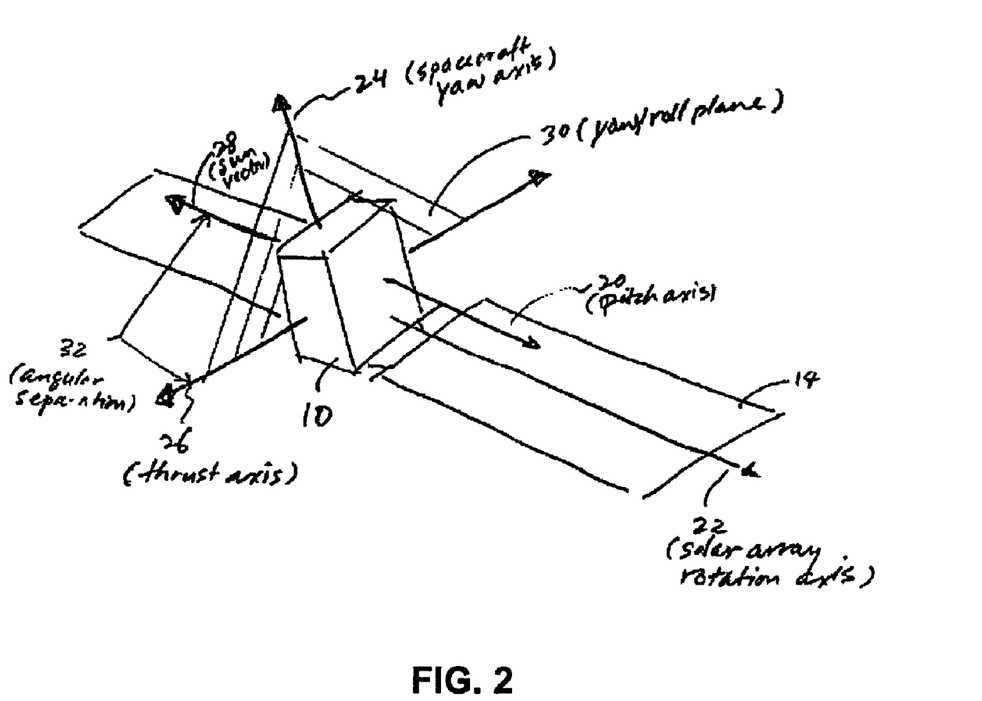
FIG. 2 is a simplified schematic diagram showing the spacecraft thrust trajectory tracking and solar array sun pointing geometry for orbit transfer according to one embodiment of the present invention.

FIG. 2 shows the spacecraft thrust trajectory tracking and solar array sun pointing geometry for orbit transfer. The pitch axis 20 is parallel to the solar array rotation axis 22, and the yaw axis 24 is directed outward from the spacecraft nadir face. The nominal HCT thrust axis 26 is roughly along the spacecraft roll axis (the situation when the west face HCT pair is fired). During orbit transfer, the spacecraft attitude is controlled to align the nominal HCT thrust axis 26 with an inertial frame thrust trajectory vector. The thrust trajectory vector is computed on-board the spacecraft 10 based on the results of ground-based numerical optimization. Calculation of the thrust trajectory vector is commonly known in the art. Concurrently, the spacecraft 10 rotates about the thrust axis 26 to maintain a sun vector 28 in a yaw/roll plane 30. As can be seen from FIG. 2, when the sun vector 28 lies in the yaw/roll plane 30, the solar arrays 14 may be positioned so that the solar array normal vectors are pointed directly at the sun, thereby allowing maximum solar array power to be obtained.

The foregoing thrust/sun tracking strategy is referred to as "ideal" because it results in minimal solar array sun pointing errors. Deviation from the ideal strategy is only necessary when the angular separation 32 between the thrust trajectory vector along the thrust axis 26 and sun vector 28 becomes small, i.e., when the thrust trajectory vector enters the so called "proximity region" as further defined herein. In the proximity region, the control torques and angular rates required to follow an ideal trajectory can become large, beyond the system's control capability using the RWAs and gimbaled HCTs. In fact, a singularity condition can occur when the thrust trajectory vector and the sun vector 28 become co-aligned, where an instantaneous 180 deg rotation is necessary to track the ideal profile. Therefore, when the thrust trajectory vector enters the proximity region, a predictive thrust/sun tracking strategy is invoked to ensure the control required is within the system's capability and that the solar array sun pointing errors are minimized.

Figure 3:
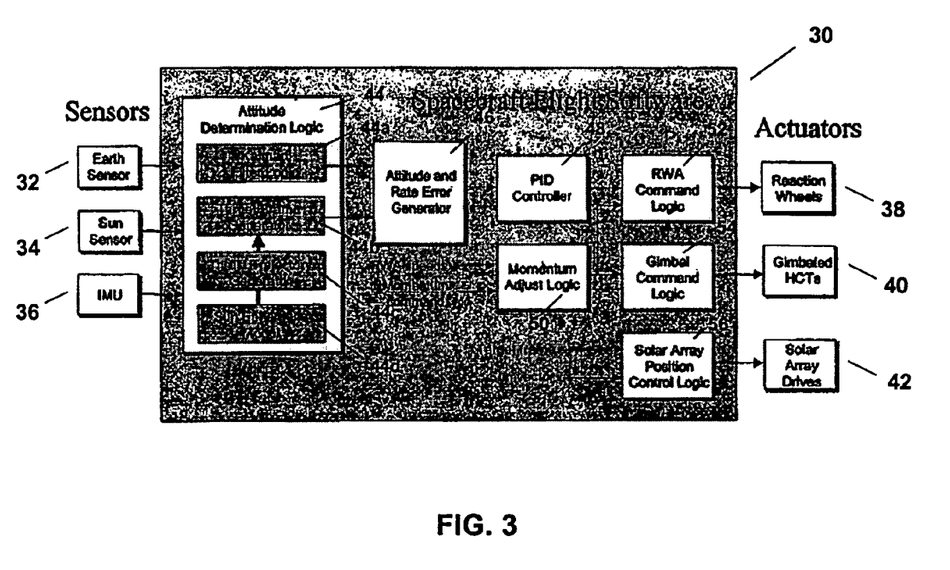
FIG. 3 is a simplified block diagram illustrating a system according to one embodiment of the present invention.

FIG. 3 illustrates a system according to one embodiment of the present invention. As mentioned above, in one embodiment, the system is implemented in the form of spacecraft flight software 30 which resides on a computer-readable medium executable by a processor onboard of the spacecraft 10. The spacecraft 10 includes an attitude sensing complement with a number of sensors including, for example, earth sensors 32, sun sensors 34, and at least one continuously operating IMU (inertial measurement unit) 36 that provides three-axis angular rate data. Data from the earth sensors 32, sun sensors 34 and the IMU 36 are provided to the system for processing to generate appropriate control signals for a number of actuators including, for example, the reaction wheel assemblies (RWAs) 38, gimbaled HCTs 40 and the solar array drives 42, as will be further described below.

The system includes various logic components such as attitude determination logic 44, attitude and rate error generator 46, Proportional-Integral-Derivative (PID) controller 48, momentum adjust logic 50, RWA command logic 52, gimbal command logic 54 and solar array position control logic 56. The attitude determination logic 44 further includes Kalman Filter logic 44a, target frame generator 44b, thrust trajectory generator 44c and Sun Ephemeris model 44d.

The Kalman Filter logic 44a uses gyro data to propagate the transformation from inertial to body coordinates. This inertial reference information is updated during portions of the orbit where the earth and/or sun sensor data is available.

The thrust trajectory generator 44c computes the inertial thrust trajectory vector by propagating orbit and co-state equations starting from ground-supplied initial conditions.

The Sun Ephemeris model 44d provides the sun vector 28 in the inertial frame. As described below, the target frame generator 44b constructs the transformation from the inertial to target frame that results in ideal thrust/sun tracking outside of the proximity region, and thrust/sun tracking using the predictive strategy within the proximity region.

The attitude and rate error generator 46 uses the target frame and inertial reference provided by the Kalman Filter logic 44a and the target frame generator 44b to compute attitude and rate errors that are then input to the PD controller 48.

The PID controller 48 computes the RWA torque demands for attitude control.

The momentum adjust logic 50 uses the RWA speeds and momentum commands to compute the momentum adjust torque demands. The momentum adjust torque demands are then input to the gimbal command logic 54 and the RWA command logic 52.

The RWA torque demands for attitude control from the PID controller 48, the momentum adjust torque demands from the momentum adjust logic 50, and an output from the gimbal command logic 54 are then used by the RWA command logic 52 to generate the total RWA torque demands which are then applied to the RWAs 38.

The gimbal command logic 54 uses the momentum adjust torque demands to drive the gimbaled HCTs 40.

The solar array position control logic 56 uses the target frame and the sun vector information to control the solar array position based on the sun vector orientation in the target frame.

In one exemplary aspect, the target frame generator 44b operates in one of two modes. The first mode is the ideal thrust/sun tracking mode that is used when the angular separation 32 between the sun vector 28 and thrust trajectory vector exceeds the proximity region threshold angle δ. The threshold angle δ is, for example, typically about 20 to 30 degrees. Based on the disclosure and teachings provided herein, a person of ordinary skill in the art will understand how to appropriately determine the threshold angle δ according to the present invention. The second mode is the proximity region control mode or predictive mode, which is automatically invoked when the angular separation 32 between the sun vector 28 and the thrust trajectory vector is below the threshold angle δ.

In one exemplary aspect, the target frame generator 44b determines the target frame for orbit transfer attitude control according to the steps below. The target frame generator 44b first determines the rotation from the Earth Centered Inertial (ECI) frame to an intermediate target frame (a frame where the body thrust axis is aligned with the thrust trajectory vector). Next, a second rotation is implemented about the body frame thrust axis that either places the sun vector 28 in the spacecraft yaw-roll plane 30 for ideal control, or when propagated forward in time will place the sun in the yaw-roll plane 30 at the time the thrust trajectory vector exits the proximity region. The foregoing process is further explained below.

Step 1: Compute the ECI to intermediate target frame quaternion $q_{exi2itar}$ that rotates the body thrust axis $\overline{B}$ to become aligned with the inertial thrust trajectory axis $\overline{T}$. It should be noted that the body thrust axis is typically the plus or minus roll axis for the body-mounted HCT configuration or the yaw axis for an aft-mounted HCT configuration.

Step 2: Determine the rotation about the body thrust axis that transforms from the intermediate target frame to the target frame, represented by the quaternion $\overline{q}_{itar2tar}$ according to a) Outside of the proximity region, find the rotation about the body thrust axis that places the sun vector in the yaw-roll plane.

b) Inside the proximity region, find the rotation about the body thrust axis that when propagated forward in time will place the sun in the yaw-roll plane at the exit of the proximity region.

Step 3: Combine the two quaternions determined in Steps 1 and 2 to get the ECI to target frame quaternion $$\overline{q}_{eci2tar} = \overline{q}_{itar2tar} * \overline{q}_{eci2itar} \quad \text{Eqn. (1)}$$

In the proximity region, the logic predicts where the thrust trajectory vector will exit the proximity region and controls the angle about the thrust axis 26 so that it becomes equal to the exit value when the thrust trajectory vector arrives at the proximity region exit. The steps necessary to generate the ECI to target frame quaternion when the thrust trajectory vector is in the proximity region are further described below.

First, three unit vectors are defined: the thrust trajectory vector $\overline{a}$, the trajectory vector rate $\overline{b}$, and the predicted thrust trajectory vector at the proximity region exit $\overline{c}$. The predicted thrust trajectory vector $\overline{c}$ will lie in the plane defined by $\overline{a}$ and $\overline{b}$, and the angle between the predicted thrust trajectory vector $\overline{c}$ and the sun vector $\overline{S}$ is equal to the proximity angle threshold δ, i.e., $$\overline{c} \cdot \overline{S} = \cos \delta \quad \text{Eqn. (2)}$$

where $\overline{c} \cdot \overline{S}$ denotes the vector dot product. The predicted thrust trajectory vector $\overline{c}$ can be expressed as a linear combination of $\overline{a}$ and $\overline{b}$ $$\overline{c} = \overline{a} \cos \theta + \overline{b} \sin \theta \quad \text{Eqn. (3)}$$

where θ is the angle between the current thrust trajectory vector and the predicted thrust trajectory vector at the proximity region exit and where $$\overline{a} = \overline{T}$$

$$\overline{b} = \frac{\overline{T} - \overline{T}_{old}}{|\overline{T} - \overline{T}_{old}|}$$

where $\overline{a} \cdot \overline{b} = 0$

Note that in the above expressions, $\overline{T}$ is the thrust trajectory vector at the current time step and $\overline{T}_{old}$ is the thrust trajectory vector at the previous time step. Dotting both sides of Eqn. (3) by the sun vector and substituting into Eqn. (2) yields $$\overline{c} \cdot \overline{S} = (\overline{a} \cos \theta + \overline{b} \sin \theta) \cdot \overline{S}$$

$$\cos \delta = (\overline{a} \cdot \overline{S}) \cos \theta + (\overline{b} \cdot \overline{S}) \sin \theta$$

Figure 4:
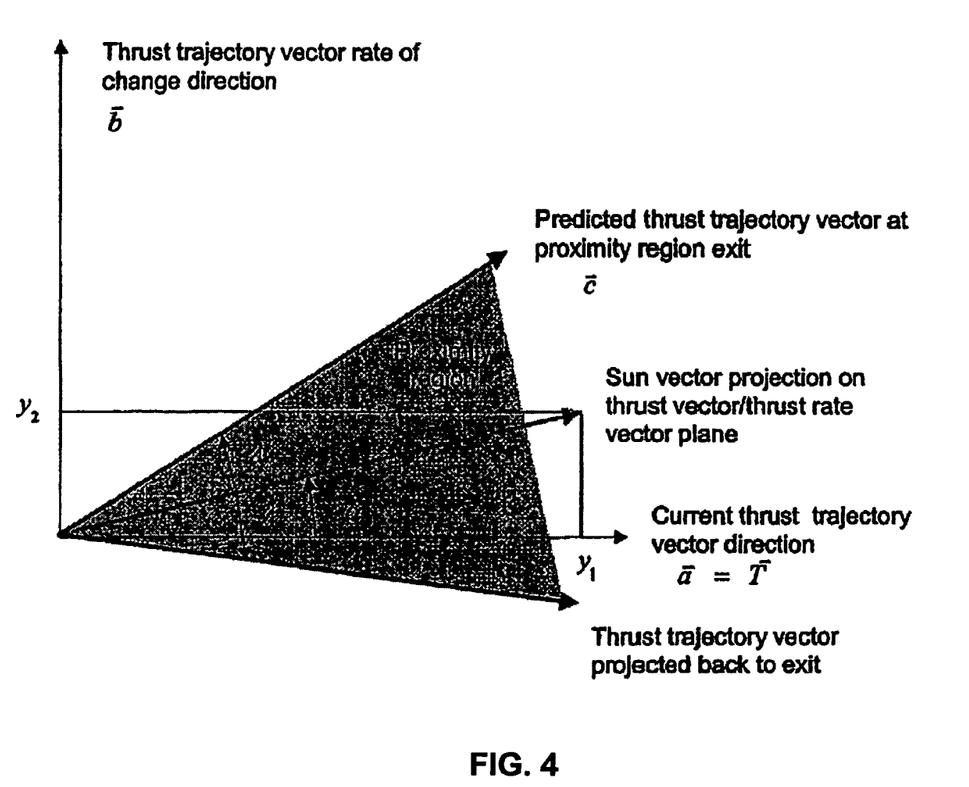
FIG. 4 is a graph illustrating the proximity region sun and thrust trajectory vector geometry according to one embodiment of the present invention.

The above equation can be rewritten as $$x = y_1 \cos \theta + y_2 \sin \theta \quad \text{Eqn. (4)}$$

where
$x = \cos \delta$
$y_1 = \overline{a} \cdot \overline{S}$
$y_2 = \overline{b} \cdot \overline{S}$ The proximity region sun and thrust trajectory vector geometry is shown in FIG. 4. Two solutions for θ are possible in Eqn. (4), with the positive one corresponding to the projected thrust trajectory vector at the proximity region exit given by $$\theta = \alpha + \lambda \quad \text{Eqn. (5)}$$

$$\alpha = \tan^{-1}\left(\frac{y_1}{y_2}\right)$$

$$\lambda = \cos^{-1}\left(\frac{x}{\sqrt{y_1^2 + y_2^2}}\right)$$

Using the value of θ determined from Eqn. (5), the projected thrust trajectory vector at the proximity region exit $T_{predicted} = \overline{c}$ may be computed using Eqn. (3). The predicted target frame quaternion at the exit of the proximity region is then computed using Eqn. (1) based on $\overline{S}$ and $T_{predicted}$.

The following steps are then performed to determine the target frame quaternion at each time step while the thrust trajectory vector is within the proximity region. The thrust trajectory instantaneous angular rate is given by $$\omega = \frac{\sin^{-1}(|\overline{T}_{old} \times \overline{T}|)}{\Delta t} \quad \text{Eqn. (6)}$$

where Δt is the sampling interval and x denotes the vector cross product. The angle between the present thrust trajectory vector and the predicted thrust trajectory vector at the proximity region exit is $$\phi = \sin^{-1}(|\overline{T}_{predicted} \times \overline{T}|)$$ Eqn. (7)

Using the results of Eqns. (6) and (7), the estimated time remaining until the thrust trajectory vector exits the proximity region is $$t_{slew} = \frac{\phi}{\omega}$$ Eqn. (8)

Next, the rotation angle β is determined that is used to compute the intermediate target frame to current target frame quaternion as $$\overline{q}_{1tar2tar} = \begin{Bmatrix} \overline{B} \sin\left(\frac{\beta}{2}\right) \\ \cos\left(\frac{\beta}{2}\right) \end{Bmatrix}$$ Eqn. (9)

During ideal thrust/sun tracking, the beta angle is the rotation about the nominal HCT body frame thrust axis $\overline{B}$ that places the sun vector in the spacecraft yaw/roll plane. In the proximity region, the predictive thrust/sun tracking strategy uses a beta angle that is propagated using the expression $$\beta(k) = \beta(k-1) + \Delta\beta$$ Eqn. (10)

where the index k denotes the time step and Δβ is the beta angle increment. The propagation is initialized using the beta angle at entry to the proximity region. The beta angle increment is determined at each time step as $$\Delta\beta = \frac{\beta_{exit} - \beta(k-1)}{t_{slew}} \Delta t$$ Eqn. (11)

where $\beta_{exit}$ is the beta angle for ideal thrust/sun tracking based on the predicted thrust trajectory vector at the proximity region exit. To maintain the thrust rotation rate within the system's capability, the beta angle increment is limited according to $$\Delta\beta = \text{sign}(\Delta\beta)\dot{\beta}_{max} \Delta t \text{ if } |\Delta\beta| > \dot{\beta}_{max}\Delta t$$ Eqn. (12)

where $\dot{\beta}_{max}$ is the maximum allowable thrust axis rotation rate.

Finally, at each time step within the proximity region, the inertial to target frame quaternion is determined using Eqn. (1), based on the intermediate target frame to target frame quaternion determined using Eqn. (9) and the beta angle determined using Eqn. (10).

Figure 5:
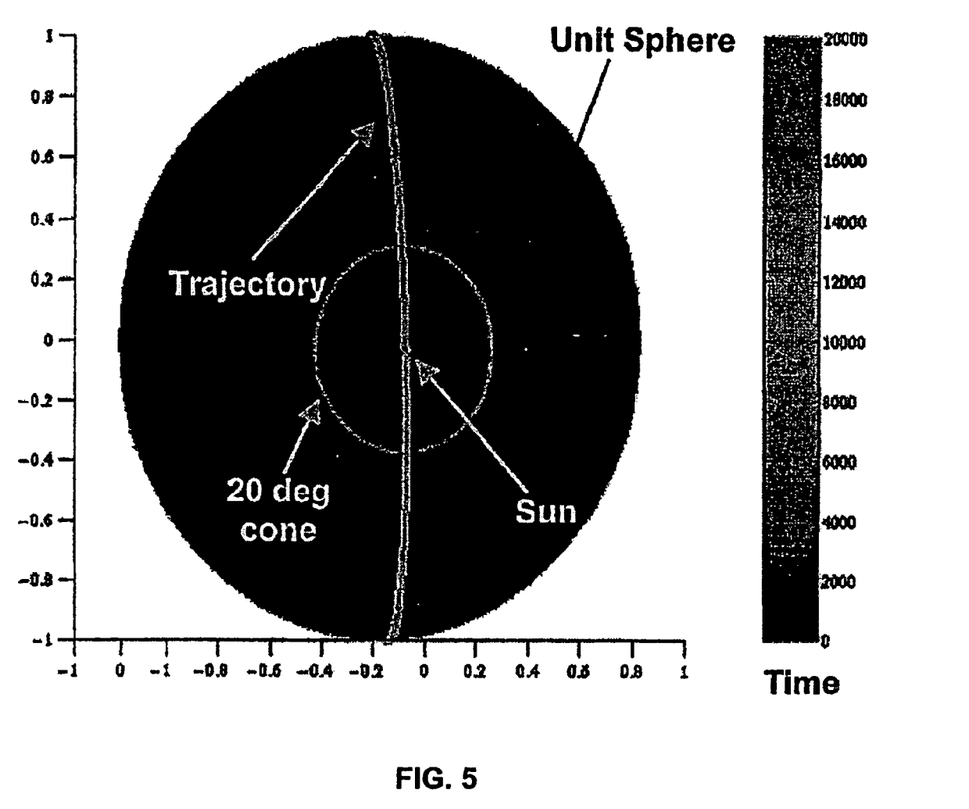
FIG. 5 is a graph illustrating the thrust trajectory vector and sun vector geometry for a simulation case according to one embodiment of the present invention.

FIG. 5 shows the thrust trajectory vector and sun vector geometry for a simulation case that demonstrates the performance benefit of an orbit transfer attitude control system according to one embodiment of the present invention. The proximity region boundary is a 20-degree diameter circle centered on the sun vector. As can be seen, the thrust trajectory vector crosses directly through the center of the proximity region.

Figure 6:
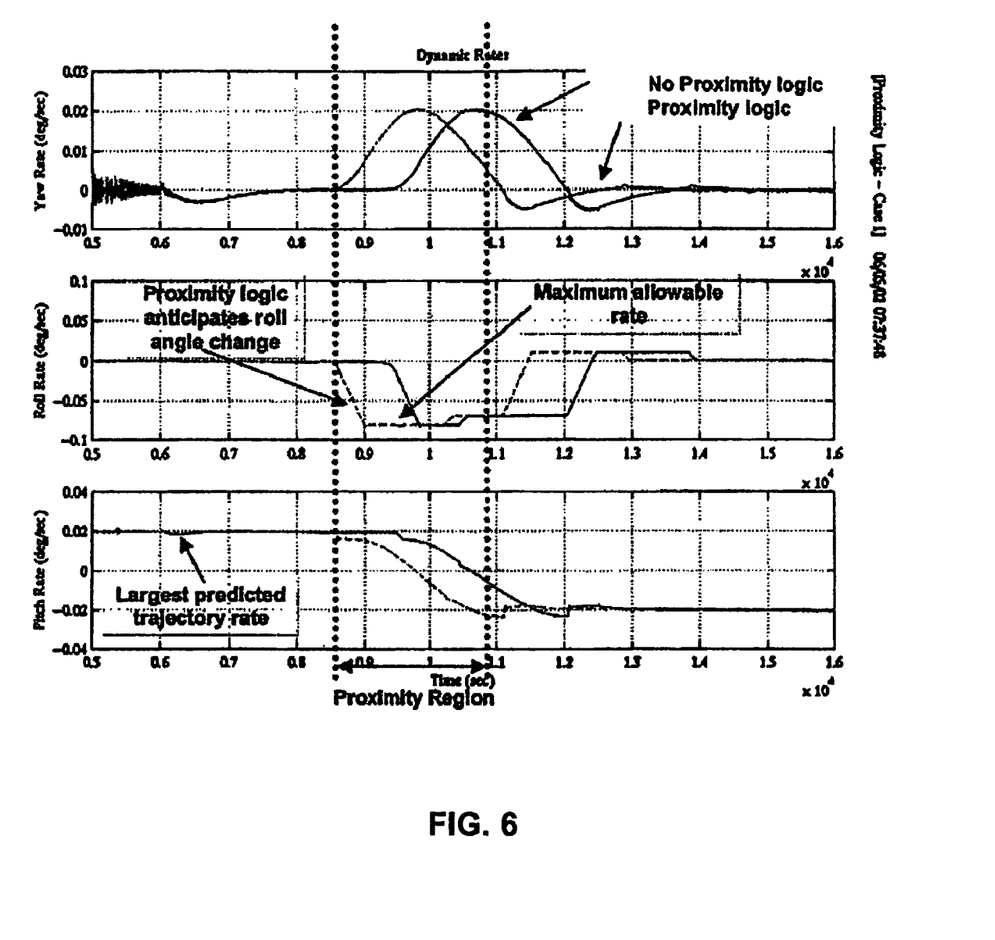
FIGS. 6 and 7 are graphs illustrating simulation data results according to one embodiment of the present invention.
Figure 7:
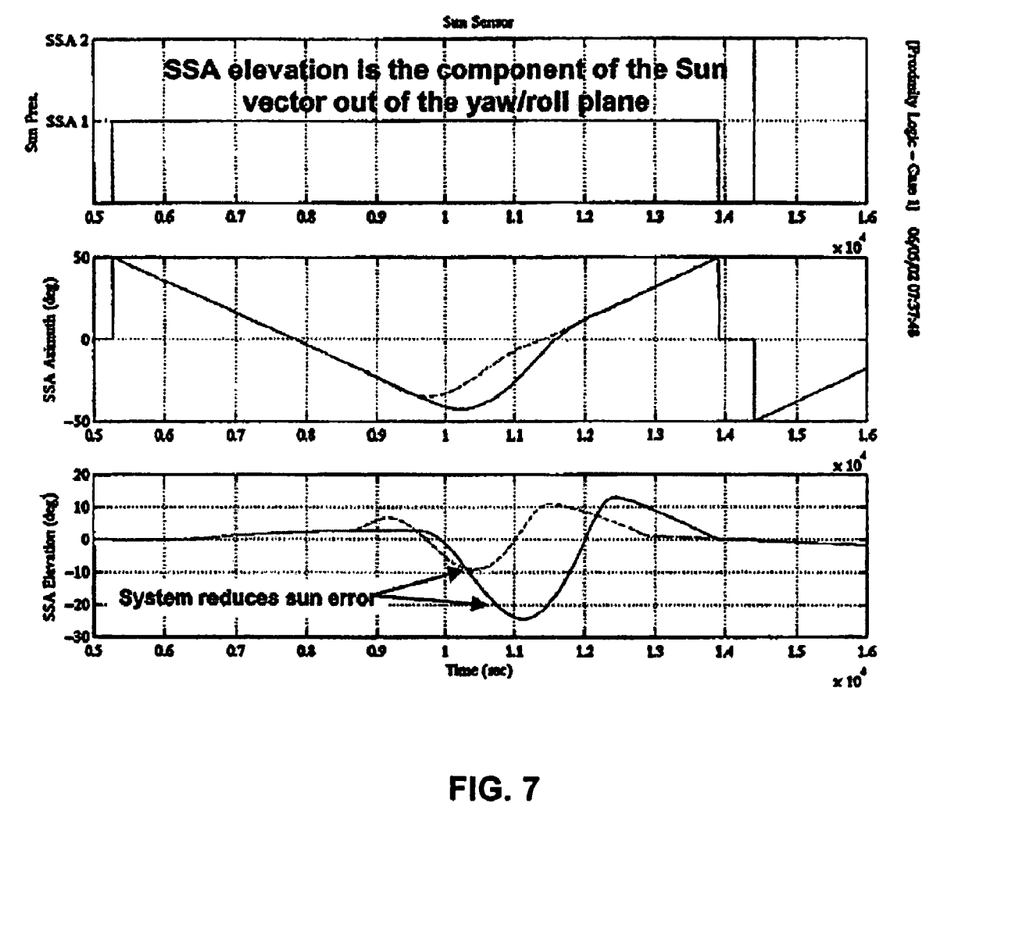

FIG. 6 shows the simulated spacecraft body rates. FIG. 7 shows the sun sensor angle time history for both a conventional system (blue time history) and a system according to the present invention (red time history). Vertical dashed lines mark the proximity region entry and exit times. For this example, the conventional and invention proximity region rate responses are similar, but the conventional system's roll rotation transient is delayed by roughly 13 minutes. In contrast, at entry to the proximity region, the system according to the present invention predicts the need for a 180-degree rotation to maintain sun pointing and immediately starts the rotation. The performance benefit of the predictive control can be seen from the sun sensor angle time histories given in FIG. 7. The sun sensor elevation angle (the bottom plot in FIG. 7) is equal to the angle between the sun vector and the spacecraft yaw-roll plane. This is the minimum angle possible between the solar array normal and the sun vector. As can be seen, the maximum solar array sun pointing error is roughly 25 degrees for the conventional system, and about 10 degrees for the system according to the present invention. This peak sun pointing error produces a 10% reduction in the solar array output for the conventional system and only a 1.5% reduction for the system according to the present invention.

Based on the disclosure and teachings provided herein, it should be understood that the present invention can be used in a variety of applications including; for example, commercial and/or government spacecraft programs including satellites and other space-based vehicles. A person of ordinary skill in the art will appreciate other ways and/or methods to deploy the present invention in different types of applications.

It should be understood that the present invention as described above can be implemented in software, hardware, or a combination of both, in the form of control logic in a modular or integrated manner, on computer-readable media or otherwise. Based on the disclosure and teachings provided herein, a person of ordinary skill in the art will appreciate other ways and/or methods to implement the present invention.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A system for providing precision thrust and sun tracking attitude control, comprising:
   control logic configured to determine an angle between a thrust trajectory vector and a sun vector; and
   control logic configured to engage an ideal operational mode to provide attitude control when the angle between the thrust trajectory vector and the sun vector exceeds a threshold value or a predictive operational mode to provide attitude control when the angle between the thrust trajectory vector and the sun vector is below the threshold value,
   wherein, the predictive operational mode predicts the orientation of the thrust trajectory vector at a proximity region exit and adjusts the attitude control based on the predicted orientation of the thrust trajectory vector.

2. The system of claim 1 wherein the threshold value is about 20-30 degrees.

3. The system of claim 1 wherein the predictive operational mode calculates the thrust trajectory vector, predicts the orientation of the thrust trajectory vector at the proximity region exit and adjusts the attitude control on a periodic basis.

4. A satellite incorporating the system as recited in claim 1.

5. The system of claim 4 wherein the system is implemented as part of flight software configured to control the satellite; and wherein the flight software resides on a computer-readable medium executable by a processor onboard the satellite.

6. A system for providing precision thrust and sun tracking attitude control, comprising:
control logic configured to determine a proximity region; and
control logic configured to engage an ideal operational mode to provide attitude control when a thrust trajectory vector is out of the proximity region or a predictive operational mode to provide attitude control when the thrust trajectory vector is in the proximity region,
wherein, the predictive operational mode predicts the orientation of the thrust trajectory vector at an exit from the proximity region and adjusts the attitude control based on the predicted orientation of the thrust trajectory vector.

7. The system of claim 6 wherein the proximity region is determined based on an angle between the thrust trajectory vector and a sun vector.

8. The system of claim 7 wherein the angle is about 20-30 degrees.

9. The system of claim 6 wherein the predictive operational mode periodically re-calculates the thrust trajectory vector, predicts the orientation of the thrust trajectory vector at the exit from the proximity region and adjusts the attitude control.

10. A satellite incorporating the system as recited in claim 6.

11. The system of claim 10 wherein the system is implemented as part of flight software configured to control the satellite; and
wherein the flight software resides on a computer-readable medium executable by a processor onboard the satellite.

12. A spacecraft comprising:
a plurality of sensors;
a plurality of actuators including a plurality of reaction wheel assemblies, a plurality of gimbaled thrusters and a plurality of solar arrays;
a processor having flight control logic residing thereon;
wherein the flight control logic is configured to:
receive input information from the plurality of sensors;
determine a proximity region based on the input information; and
engage a first operational mode to provide attitude control with respect to the plurality of actuators when a thrust trajectory vector is out of the proximity region or a second operational mode to provide attitude control with respect to the plurality of actuators when the thrust trajectory vector is in the proximity region,
wherein, the second operational mode predicts the orientation of the thrust trajectory vector at an exit from the proximity region and adjusts the attitude control based on the predicted orientation of the thrust trajectory vector.

13. The spacecraft of claim 12 wherein the flight control logic is further configured to determine the proximity region based on an angle between the thrust trajectory vector and a sun vector.

14. The spacecraft of claim 13 wherein the angle is about 20-30 degrees.

15. The spacecraft of claim 12 wherein the second operational mode periodically re-calculates the thrust trajectory vector, predicts the orientation of the thrust trajectory vector at the exit from the proximity region, and adjusts the attitude control.

16. The spacecraft of claim 15 wherein the attitude control adjustment includes change to one or more of the plurality of gimbaled thrusters.

17. The spacecraft of claim 15 wherein the attitude control adjustment includes orientation change to one or more of the plurality of solar arrays so as to reduce sun-pointing errors and keep the sun in a yaw/roll plane of the spacecraft.

18. The spacecraft of claim 12 wherein the spacecraft includes a satellite.

19. A method for providing precision thrust and sun tracking attitude control, comprising:
determining an angle between a thrust trajectory vector and a sun vector; and
engaging an ideal operational mode to provide attitude control when the angle between the thrust trajectory vector and the sun vector exceeds a threshold value or a predictive operational mode to provide attitude control when the angle between the thrust trajectory vector and the sun vector is below the threshold value,
wherein, the predictive operational mode predicts the orientation of the thrust trajectory vector at a proximity region exit and adjusts the attitude control based on the predicted orientation of the thrust trajectory vector.

20. The method of claim 19 wherein the threshold value is about 20-30 degrees.

21. The method of claim 19 further comprising:
when in the predictive operational mode:
calculating the thrust trajectory vector, predicting the orientation of the thrust trajectory vector at the proximity region exit and adjusting the attitude control on a periodic basis.

22. A spacecraft including a satellite, utilizing the method as recited in claim 19.

23. Flight software having instructions to effect the method as recited in claim 19, the flight software residing on a computer-readable medium executable by a processor onboard a spacecraft including a satellite.

24. A method for controlling thrust and sun tracking attitude with respect to a spacecraft having a plurality of sensors and a plurality of actuators including a plurality of gimbaled thrusters and a plurality of solar arrays, the method comprising:
receiving input information from the plurality of sensors;
determining a proximity region based on the input information; and
engaging a first operational mode to provide attitude control with respect to the plurality of actuators when a thrust trajectory vector is out of the proximity region or a second operational mode to provide attitude control with respect to the plurality of actuators when the thrust trajectory vector is in the proximity region,
wherein, the second operational mode predicts the orientation of the thrust trajectory vector at an exit from the proximity region and adjusts the attitude control based on the predicted orientation of the thrust trajectory vector.

25. The method of claim 24 wherein the proximity region is determined based on an angle between the thrust trajectory vector and a sun vector.

26. The method of claim 25 wherein the angle is about 20-30 degrees.

27. The method of claim 26 further comprising:
when in the second operational mode, on a periodic basis, re-calculating the thrust trajectory vector;
predicting the orientation of the thrust trajectory vector at the exit from the proximity region; and based on the predicted orientation of the thrust trajectory vector at the exit from the proximity region, adjusting the attitude control for the plurality of actuators.

28. The method of claim 27 wherein the attitude control adjustment includes change to one or more of the plurality of gimbaled thrusters.

29. The method of claim 27 wherein the attitude control adjustment includes orientation change to one or more of the plurality of solar arrays so as to reduce sun-pointing errors and keep the sun in a yaw/roll plane of the spacecraft.

30. Flight software having instructions to effect the method as recited in claim 24, the flight software residing on a computer-readable medium executable by a processor onboard the spacecraft including a satellite.

* * * * *

UNITED STATES PATENT AND TRADEMARK OFFICE
CERTIFICATE OF CORRECTION

PATENT NO.        : 7,464,898 B1
APPLICATION NO. : 10/963574
DATED             : December 16, 2008
INVENTOR(S)       : Neil E. Goodzeit et al.

It is certified that error appears in the above-identified patent and that said Letters Patent is hereby corrected as shown below:

Column 5, Line 37: Replace: " $q_{exi2itar}$ " with -- $q_{eci2itar}$ --

Column 7, Line 46: Replace: " $\Delta\beta = sign(\Delta\beta)\beta_{max} t$ if $|\Delta\beta| > \beta_{max}\Delta t$ "

with: -- $\Delta\beta = sign(\Delta\beta)\dot{\beta}_{max}\Delta t$ if $|\Delta\beta| > \dot{\beta}_{max}\Delta t$ --

Column 7, Line 48: Replace: " $\beta_{max}$ " with -- $\dot{\beta}_{max}$ --

Signed and Sealed this

Seventeenth Day of March, 2009

JOHN DOLL
*Acting Director of the United States Patent and Trademark Office*